April 4, 1961

J. C. SIMS, JR., ET AL 2,978,681

MAGNETIC CORE MEMORY DEVICE

Filed June 13, 1955

5 Sheets-Sheet 1

INVENTORS
JOHN C. SIMS JR.
WILLIAM J. BARTIK

BY [signature]

ATTORNEY

INVENTORS
JOHN C. SIMS JR.
WILLIAM J. BARTIK
BY [signature]
ATTORNEY

April 4, 1961 J. C. SIMS, JR., ET AL 2,978,681

MAGNETIC CORE MEMORY DEVICE

Filed June 13, 1955

5 Sheets-Sheet 3

INVENTORS
JOHN C. SIMS JR.
WILLIAM J. BARTIK
BY [signature]
ATTORNEY

April 4, 1961 J. C. SIMS, JR., ET AL 2,978,681

MAGNETIC CORE MEMORY DEVICE

Filed June 13, 1955

5 Sheets-Sheet 4

INVENTORS
JOHN C. SIMS JR.
WILLIAM J. BARTIK
BY [signature]
ATTORNEY

MAGNETIC CORE MEMORY DEVICE

Filed June 13, 1955 5 Sheets-Sheet 5

INVENTORS
JOHN C. SIMS JR.
WILLIAM J. BARTIK
BY J. L. Sterling
ATTORNEY 2,978,681

MAGNETIC CORE MEMORY DEVICE

John C. Sims, Jr., Springhouse, and William J. Bartik, Hatboro, Pa., assignors, by mesne assignments, to Sperry Rand Corporation, New York, N.Y., a corporation of Delaware Filed June 13, 1955, Ser. No. 515,062
19 Claims. (Cl. 340—174)

This invention relates generally to devices comprised of a plurality of core structures, each having a plurality of windings by lines associating each core structure with groups thereof extending in at least two different directions, said devices being such as magnetic memories, storage units or the like, the invention relating more particularly to devices of this type, and a method of assembling them, wherein the several cores are physically disposed with respect to each other in an array assuming a three-dimensional form.

The invention is disclosed herein in an embodiment adapted to serve as a buffer storage in a data processing machine, such as for example a card to tape converter of the type disclosed in the co-pending application filed June 13, 1955, Serial Number 515,102. As used in a machine of this type, the memory unit stores data read thereinto during the relatively slow sensing of the data from a standard punched card, as a preliminary step to the encoding and recording magnetically, in binary code on a magnetic tape, of such data or to the comparing of the data so stored with data sensed on the magnetic tape, the read-out of the memory unit being carried out at a relatively higher speed commensurate with the higher speeds possible in magnetic recording and reading techniques. In such applications the memory unit is required to have a capacity which is at least equal to the data capacity for example of the said standard eighty column card, wherein each card column is comprised of twelve data index positions, thereby calling for at least nine hundred sixty separate core structures within the memory unit. In the present instance, the individual core structures are wound so as to be significantly saturated for data storage purposes upon the coincidence of currents in two dimensions with respect to each core, the wiring being representable schematically by an array twelve by eighty, the eighty cores of one dimension being connected in series, hereinafter referred to also as a row corresponding to a horizontal row of index positions of an eighty column punched card, the twelve core structures of the other dimension also being connected in series, and hereinafter referred to as a column, corresponding to the twelve index positions in a column on a standard eighty column punched card. In the present instance, each core is also provided with a third or pick-up winding which runs in the same dimension as the row winding interconnecting in series the eighty cores of a row. Read-out signals are obtained in a column by column manner by successively pulsing the windings which run in the column-wise dimension with a pulse of a polarity opposite to that of the write-in pulse so as to thereby restore any significantly saturated core to its original condition and thus induce a signal on the related pick-up or output lines.

One of the problems which has been encountered in constructing magnetic core memories of this type has been in physically arranging the respective core structures of a unit in such a manner as to render the over-all compactness of the unit more compatible with greater facility in the technique for wiring each of the respective core structures. It will, of course, be apparent that this problem becomes increasingly acute according to the greater capacity required of the device and/or the larger number of turns required in each of the respective windings on the several core structures. Another problem which has been encountered in devices of this type has been the difficulty with which the repair and test of individual core structures and/or their windings could be effected. The repair or replacement of a single core would ordinarily necessitate the rewiring of all the cores in the several dimensions associated with the replaced or repaired core. It will readily be understandable that this problem becomes of increasing magnitude in direct proportion to the increase in capacity of the device involving greater number of cores in any given dimension. Another problem has been to provide an array of core structures which possesses the advantages of multi-turn windings for each core structure without the necessity of winding the several turns of a winding with respect to a separate core individually and also to provide an arrangement wherein the core structures are adequately protected from damage thereto by handling.

It is, therefore, an object of this invention to facilitate the wiring of devices of the type herein disclosed.

It is a further object of the invention to render devices of the type herein disclosed more compact.

It is a still further object of the invention to provide means for supporting core structures whereby a greater use may be made of multi-turn winding techniques, and wherein the separate cores are protected from handling even during the winding thereof.

Another object of the invention is to sectionalize the structure of the over-all unit into sub-units of similar construction whereby the testing, repair, replacement or additions to the unit for varying the capacity thereof may be more readily and simply accomplished.

According to the invention, a predetermined number of cores of one dimension are supported within a single plane by a tray providing a separate compartment for each core, the cores of each tray being arranged in two files so that each core is adjacent to an edge of the tray. The cores are positioned so that the axis of the cores extend at right angles to the plane of the tray. Each core of the tray is then wound in the said one dimension by a line having loops which embrace a pair of cores. The cores of each tray are also wound with separate pick-up windings which similarly are effected by lines including loops embracing pairs of cores in the tray but not necessarily in the same paired arrangement as the first mentioned winding in the said one dimension for reasons which will be more fully explained hereinafter. Terminal posts are provided on each tray to which the opposite ends of both of said lines are connected.

For effecting the windings of the other dimensions, the individual trays, which are of identical construction, are stacked one against the other, the number of trays in a stack depending upon the number of core structures required in said other dimension. When thus stacked, each core running in said other dimension will aline with all the other cores in the same dimension and along an axis common thereto. The winding in said other dimension is effected by a line embracing all the cores of said other dimension in single loops thereof, there being sufficient loops to provide as many turns on each core as may be desired by the specific application. Since each core is disposed adjacent an edge of its associated tray, it will be seen that each of said last mentioned loops embracing all the cores of said other dimension will run first through all said cores and back around the outside of the stack of trays and, therefore, not cross or any way interfere with any other winding in the same or in the first mentioned one dimension. Multi-contact connector plugs are provided for each stack of trays to which contacts the ends of the lines effecting the wiring in said last mentioned other dimension are connected. It will be apparent from the foregoing that each stack of trays supports its associated cores in a three-dimensional physical arrangement comprising all the required elements of a memory or storage device, and that by merely connecting the proper terminals of one such device with those of another, and so on, an over-all unit of any desired capacity may be readily assembled.

For a fuller understanding of the invention and its objects, the features contributing thereto and the advantages accruing therefrom, reference may be had to the more detailed description hereinafter set forth when read in conjunction with the drawings which are as follows.

As heretofore mentioned, the invention is shown herein in an embodiment adapted to serve as a buffer storage for data sensed from a standard type of punched statistical card, the card in the present instance being an eighty column card, each card column consisting of twelve data indicating positions. As is well known, data is recorded on the card by perforations at one or more of the index positions on a card column in accordance with a punched card code, the eighty column card thereby having a capacity for recording eighty separate items of data. For convenience of description the use of the term "column" in conjunction with data indicating position will be intended to refer to the twelve index positions of each card column which extend vertically on the face of the punched card, while the term "row" in conjunction with data indicating positions will be intended to refer to the eighty corresponding positions of the several columns which extend horizontally across the face of the punched card. It will be seen therefore that the card contains a total of nine hundred and sixty data indicating or index positions, each position being identifiable merely by reference to its row and column coordinate. In order to store the data content of an entire punched card, the memory unit is provided with a separate core structure corresponding to each card index position, each core structure having in the operational scheme of the unit, although not in the physical arrangement of the structures, a column-wise and row-wise coordinate corresponding to the column-wise and row-wise coordinate of the corresponding card index position.

Figure 1:
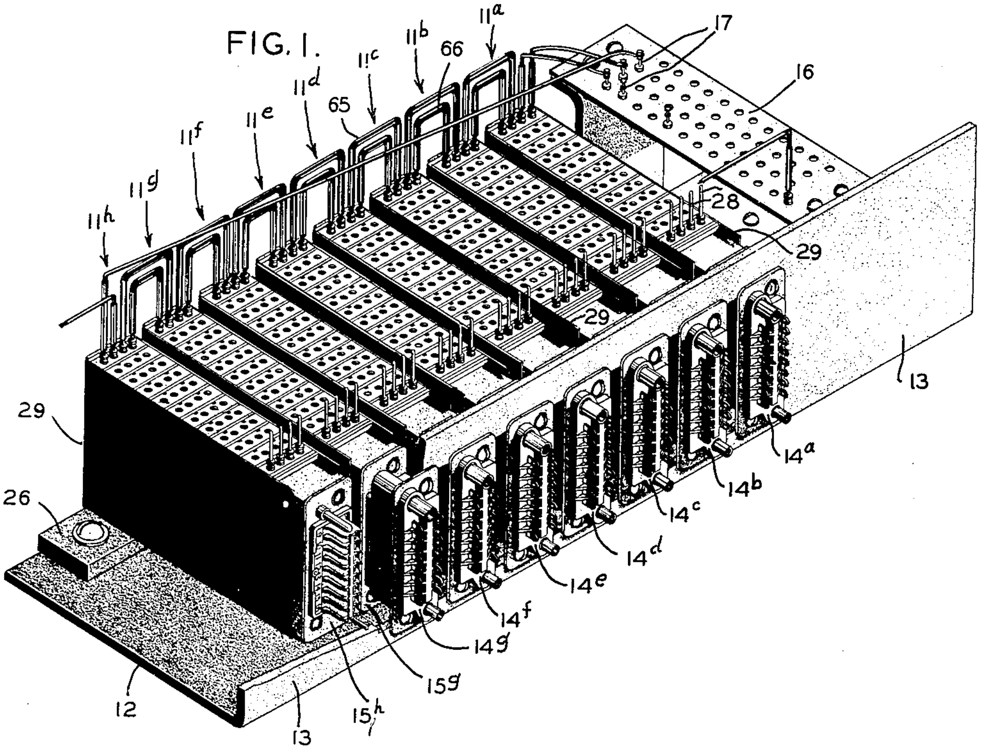
Fig. 1 is an isometric view of a memory unit constructed in accordance with the invention and consisting in the present instance of eight memory sections.

In carrying out the objects of the invention the construction of the memory unit is sectionalized into separate memory sections 11_a_, thru 11_h_, see Fig. 1, each section being of identical construction and having the capacity for storing the data from ten card columns, there being eight such sections in the present instance so as to provide sufficient capacity for storing the data sensed from an eighty column card as aforementioned. The memory sections can be mounted on any suitable chassis and preferably in side by side relation as shown in Fig. 1, the mounting means in the present instance comprising a panel bent substantially at a right angle so as to provide a supporting shelf 12 and an upright wall portion 13 having openings through which are suitably mounted multi contact female plug portions 14, each plug being connectable with corresponding male plug portions 15, each of which is secured to a respective one of the memory sections, the contacts of which plug are electrically connected to the lines which constitute the windings of the respective section along one of the coordinates or dimensions thereof. The prefixes _a–h_ for the plug portions 14, 15 designate the separate memory sections to which they are connected. The chassis is also provided with a terminal board 16 which supports a plurality of jumper or connector pins 17, to which the wires which effect the windings along the other coordinate, or dimension thru the several sections, are connected with their respective operating circuits.

Figure 2:
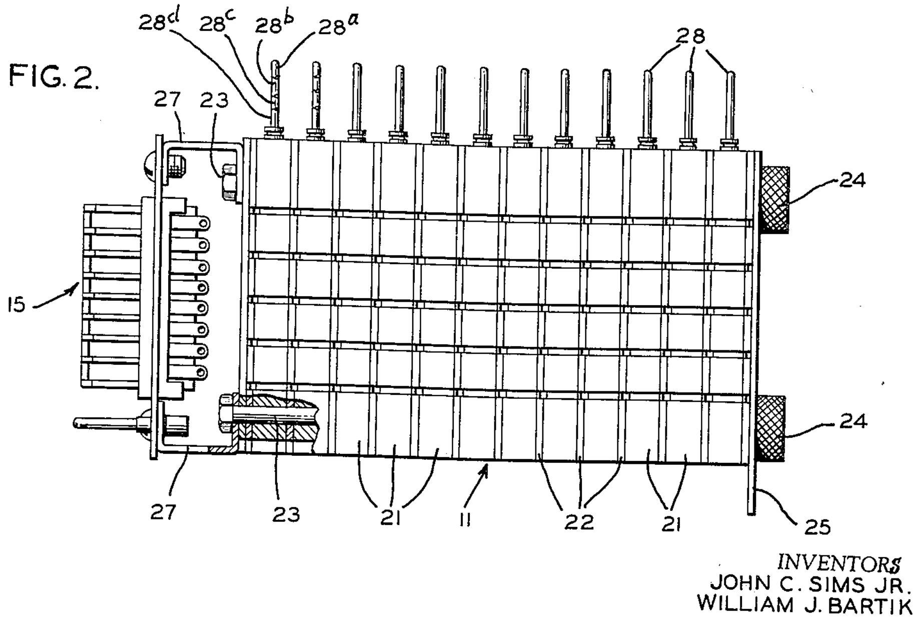
Fig. 2 is a side elevation of a memory section.
Figure 6:
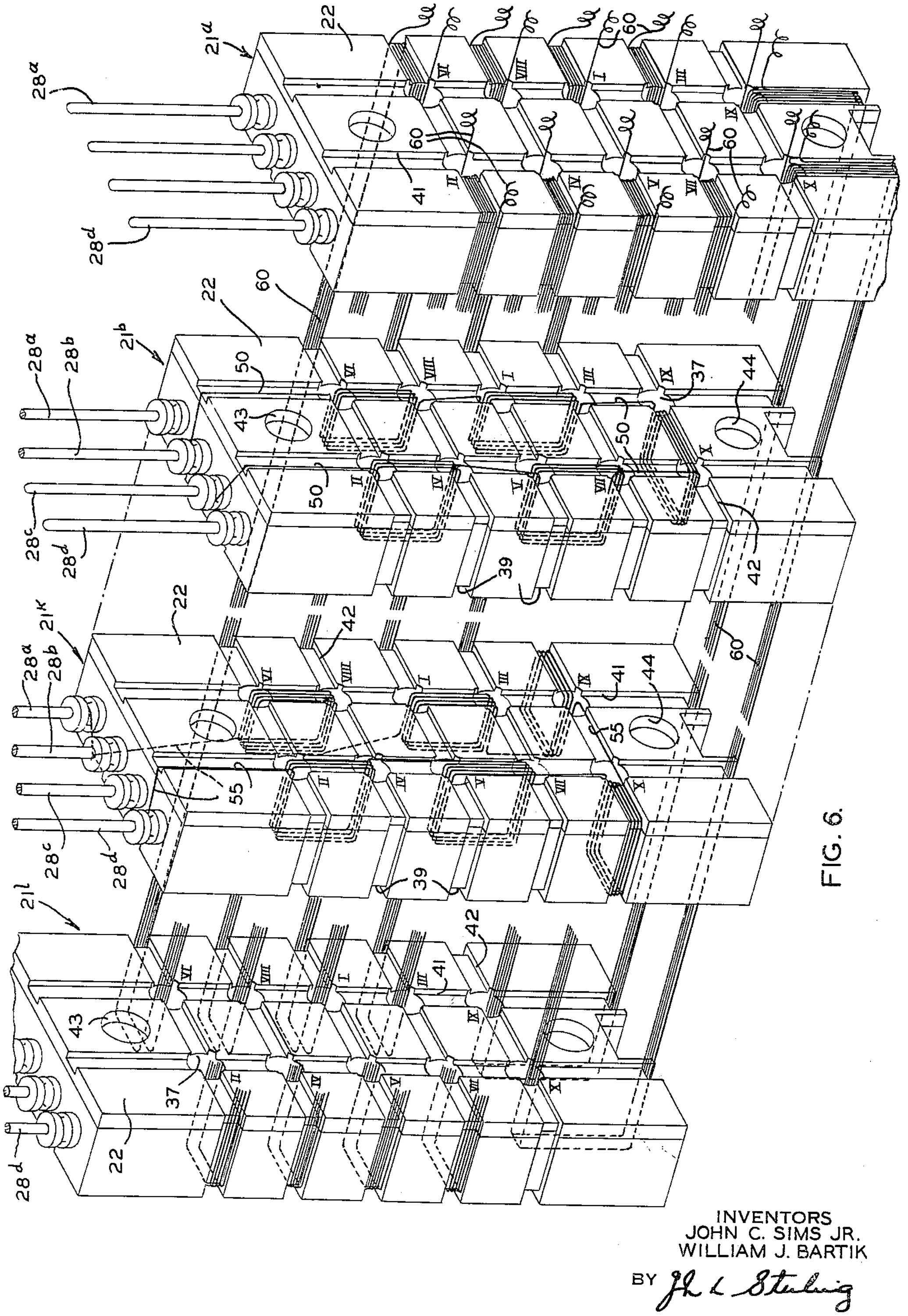
Fig. 6 is an exploded fragmentary isometric view of a section of the memory unit illustrating the actual wiring of the several trays which comprise one section of the memory unit.

The arrangement of parts constituting a memory section can best be seen by reference to Figs. 2 and 6 wherein it can be seen that each memory section is comprised of a plurality of trays 21 of insulating material which are essentially of box like shape and shown in Fig. 2 in an upright position, each tray being provided with a cover 22, the several trays of the section being suitably held in compacted and alined relationship by a pair of rods 23 extending thru suitable openings in their respective trays and threaded at their extremities to receive retaining nuts 24. Also embracing the rods 23 is a strap 25 projecting below the stack of trays in which area thereof is a hole alining with one of a series of tapped holes in a supporting rib 26, see Fig. 1, so as to thereby provide suitable means for securing the memory section to the shelf portion 12 of the memory unit chassis. The connector plug 15 secured to each memory section, and which in the present instance consists of sixteen contacts, is also supported by the rods 23 by means of brackets 27. Contained within each tray is a plurality of the core structures along one coordinate or dimension and which in the present instance is the row-wise dimension, and since each memory section is designed to a capacity of ten card columns, each tray contains ten core structures, one for each corresponding index position in each of ten card columns associated with one memory section. Since there are twelve index positions in each card column thereby calling for twelve core structures along the other or column-wise dimension, each memory section therefore includes twelve such trays. The similarly disposed core structures within each of the several trays of a section correspond to the twelve index positions of a related card column. The wires joining similarly disposed core structures within the several trays so as to effect the column-wise windings of the memory section are connected to the contacts of the plug 15 by which means they are associated with the individual means for sensing the related card columns.

The wires joining the several core structures within a single tray so as to effect the row-wise windings for the memory section are connected to jumper pins 28 of which there are four for each tray by which means corresponding trays of the several memory sections may be connected one to the other in series so as to achieve any storage capacity desired for the entire memory unit. After the wiring of the several trays of a section is completed in the manner described infra, side shields 29, see Fig. 1, are preferably secured to each stack to protect the windings thereof from exposure.

Figures 3, 4, 7, 8:
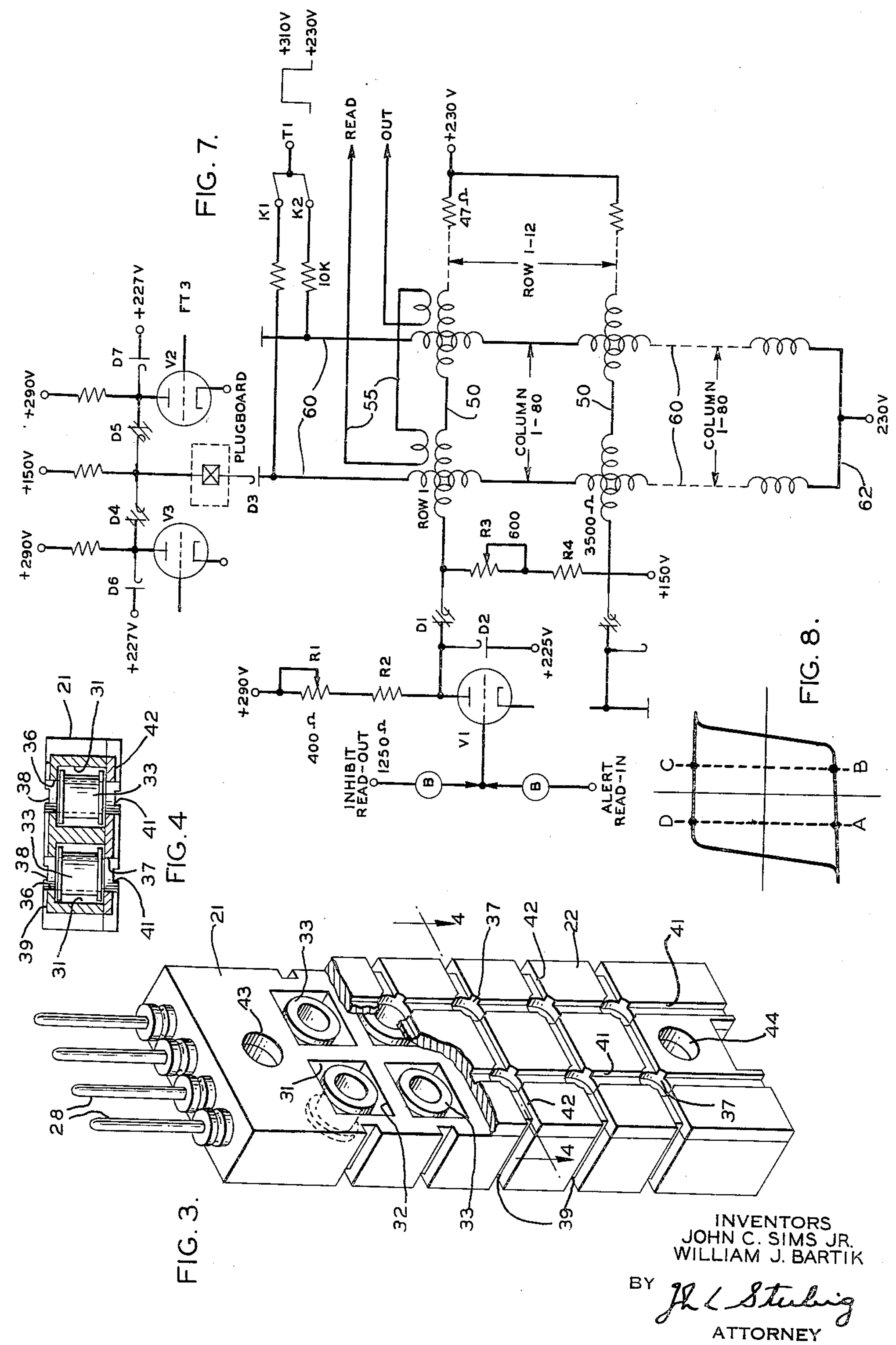
Fig. 3 is a detailed view of a core holding tray constituting one of several like portions of a memory section and without showing the wiring associated therewith.
Fig. 4 is a detailed sectional view taken along lines 4—4 of Fig. 3.
Fig. 7 is a wiring diagram illustrating circuits which may be employed for effecting the write-in and read-out of data from the unit.
Fig. 8 shows the hysteresis loop for cores of the type herein employed.

Figs. 3 and 4 show in greater detail the structural features of an individual tray 21 which is formed of any suitable non-conducting material, preferably a plastic such as Bakelite or the like. The interior of each tray is sectionalized by means of a median rib 31 extending longitudinally down the tray and a plurality of ribs 32 extending transversely thereto so as to provide 2 files of pockets or compartments within each of which a separate core structure is placed. The core structures may comprise any suitable magnetizable material possessing a substantially square hysteresis loop and formed in a substantially toroidal shape, and in the present instance toroids are employed which are formed by wrapping a ribbon of molybdenum Permalloy around the periphery of bobbins 33, best seen in Fig. 4, said bobbins being preferably of ceramic or non-magnetic material.

The tray cover 22 which is preferably of same material as of tray 21 is disposed across the open face of the tray and secured thereto by any suitable means such as cementing so as to seal in the bobbins 33 in their respective compartments of the tray. The tray and the cover are provided with openings 36, 37 respectively which communicate with each tray compartment, which openings are the same diameter as the bore of the bobbins 33 and disposed to aline therewith so as to thereby readily enable the passage of wires through the bore of the bobbin to effect the winding for the respective core structures. The outer faces of the tray are provided with a matrix of channels including a pair of longitudinally extending channels 38 and five transverse channels 39 which intersect at the openings 36, the cover being similarly provided with channels 41, 42 intersecting similarly at the cover openings 37. The transverse channels 39 extend around the sides of the tray 21 so as to communicate with a corresponding channel 42 in the cover 22. Said matrix or net work of channels provides paths for containing the wires which form the windings of the several cores contained within the trays, enabling the several trays of a memory section to be mounted flush with each other thereby effecting a sealed inclosure for the wiring of a memory section. The openings 43 in each tray together with similar openings 44 alined therewith in the tray covers 22, receive the tie rods 23, by which means the several trays of the memory section are held in assembled relationship, as hereinbefore described.

Fig. 6 illustrates the manner in which the several windings on each core of a memory section is effected, and although only four trays 21 are shown which is believed a sufficient number to properly illustrate the principle involved, it should be understood that any number of trays may comprise the assemblage of a memory section depending on the number of cores required in the column-wise dimension, there actually being twelve trays to a memory section in the present embodiment to thereby provide twelve core dimensions corresponding to the twelve index position card colmns, as hereintofore described. The intermediate trays shown, 21*b* and 21*k*, illustrate separately the windings in the row-wise dimensions, the tray 21*b* illustrating the manner in which a four turn row-wise bias winding is achieved and the ray 21*k* illustrating the manner in which a four turn row-wise pickup or output winding is achieved, it being understood that each tray of a memory section is provided with both of said windings which are shown separately for reasons of clarity. The trays 21*a* and 21*l* represent the end trays of a stack comprising a memory section 11, it being understood that said end trays also include both of the windings shown in relation to the trays 21*b* and 21*k* but not shown on the end trays for reasons of clarity, said end trays showing the manner in which the columnar write-in and read-out winding, which in the present instance is a twenty-two turn winding, for each memory section is effected.

To describe first the bias winding for each tray, shown in relation to the tray 21*b* of Fig. 6, it will be seen that the two ends of wire 50 which constitutes the bias winding for the respective cores, are connected to the jumper pins 28*c*, 28*b* of each tray. Starting at the jumper pin 28*c* the wire 50 runs in a groove 41 of the cover 22 to the nearest cover opening 37 thence thru the core disposed in alinement with said cover opening which will hereinafter be referred to as being located in the II core position. The roman numerals appearing adjacent the respective cover openings 37 intended to designate the respective core positions within a tray in accordance with the sequential order in which the ten separate column-wise windings are pulsed to read-out data from the memory sections. The wire then proceeds down the groove in rear face of the tray returning through the core in core position IV then proceeding back to the core at core position II to complete a loop embracing the cores at core positions II and IV. Since in the present instance the bias windings are required to have four turns about each core, the wire 50 is threaded three more times in the similar manner thru the cores in core positions II and IV whereupon it proceeds in the groove in the face of the cover 22 and is threaded in a similar manner in thru the core at core position V and back thru the core of core position VII completing this loop four times to similarly complete a four turn winding for the cores in the last mentioned core positions. The wire 50 is threaded to the remaining cores of the tray in a similar manner by loops which embrace the cores of core positions X, IX, the cores at positions III, I, the last loop in the line embracing the cores in core positions VIII, VI, and then proceeding by the groove 41 up the face of the cover 22 to its connection with the jumper pin 28*b*.

It is to be noted that as a result of threading the respective cores in this manner, the two cores embraced by the same loop of the wire 50 will be wound thereby in opposite directions.

The pickup windings provided for each tray of the section, as shown in Fig. 6 only in relation to the tray 21*k*, also runs row-wise and is effected by a wire 55, the ends of said wire being connected to the jumper pins 28*d*, 28*a* respectively. Proceeding from its connection with the pin 28*d*, the wire 55 runs down groove 41 in the face of the cover 22 thence into the tray and thru the core at core position II returning back thru the core in core position IV thereby embracing the cores at said two core positions by a single loop, and since in the present instance it is also desired that the pickup winding have four turns about each core, a similar loop between said two core positions is repeated three more times to provide the desired four turn winding.

The wire 55 then proceeds from core position IV down the groove in the face of the cover 22 past core position V to core position VII, being threaded in thru the core at core position VII and back thru the core at core position V to effect a loop embracing the two cores at the said last mentioned two core positions, which loop is repeated three more times so as to achieve the desired four turn winding on the respective cores. It should be noted at this point that whereas the direction of the pickup windings by wire 55 with respect to the cores at core positions II and IV is in the same direction as the bias windings for the same core positions effected by the wire 50, the direction of the windings by the wire 55 with respect to the cores at core positions V and VII is opposite to the direction of the bias windings for the latter two core positions effected by the wire 50. The reason for the reversal in direction between the bias and pickup winding at certain of the core positions will be explained more fully hereinafter. The wire 55 proceeds from core position V down the groove in the face of the cover 22 to the cover opening 37 at core position X whereupon it is threaded thru the core at position X and back around the outside of the tray 21*k* by way of groove 42 to effect a loop embracing only the single core at core position X. Said loop is repeated three more times whereupon the wire proceeds to the cover opening 37 at core position IX and is threaded thru the core at said core position and through the groove around the outside of the tray to effect a loop embracing the single core at said last mentioned core position, said loop being repeated until the wire is passed thru the core four times. The wire then proceeds by a groove 41 up the rear face of the tray 21*k* to the tray opening at core position III whereupon it is threaded thru the core at said core position and out the cover opening therefor, up the groove in the cover to the core position I and in thru the core at position I to effect a loop embracing the cores at core positions III and I which loop is repeated three more times to effect the desired four turn winding on the respective cores at said core positions. The line then proceeds from core position I up the rear face of the tray 21*k* past core position VIII to the tray opening for core position VI whereupon it is threaded out thru the core at position VI and down the cover to core position VIII, in thru the core at position VIII to effect a loop embracing the cores at positions VI and VIII. The loop embracing the cores at said last two mentioned core positions is repeated three more times whereupon the wire 50 proceeds up the rear face of the tray to its connection with the pickup jumper pin 28*a*.

As hereinabove referred to the pickup windings effected by the wire 55 for certain of the cores is in the same direction as the bias winding effected by wire 50 for the same cores, whereas others of the cores are wound by the pickup windings in a direction reverse to the direction of the bias windings. By a comparison of the showings in respect to the trays 21*b*, 21*k* it will be seen that the direction of the bias and pickup windings respectively are reversed to each other on the cores at all odd numbered core positions, i.e. positions I, III, V, VII, and IX, and are in the same direction on all cores at the even numbered core positions, i.e. II, IV, VI, VIII, X. Since the core positions are designated thus in respect to the order in which the read-out pulse is applied thereto on the read-out wire 60, it will be seen that the relative reversal in directions between the bias and pickup windings for certain of the cores follows a plan of alternation in the operational scheme of the memory section. This plan of alternation in the direction of the pickup windings is provided so as to eliminate stray noise pickup during the read-out portion of a complete operating cycle and to minimize the undesired signal developed on the output winding from the eighty cores in series when the row bias winding is pulsed. The unique handling of cores IX and X is also designed to minimize noise pickup.

The read-out windings which run columnarily thru a memory section are effected by separate wires 60 of which there is one for each of the ten core positions. The two ends at the right hand side of Fig. 6 are connected to associated contacts of the plug 15, see Fig. 2, each line proceeding from a respective one of the contacts of said plug to a corresponding one of the ten core positions in the end tray 21*a*, the line then being threaded thru the corresponding core position in each of the trays of the stack, of which there are twelve in the present instance although only four shown in Fig. 6, and out to the rear face of the tray 21*l* at the other end of the stack, whereupon the wire is brought around the side of the entire stack and back to the same core position in the tray 21*a* so as to effect a loop embracing the correspondingly positioned core in all trays of the stack or memory section. Since in the present instance the write-in, read-out winding is required to have twenty-two turns, the loop embracing all corresponding core positions in the memory section as just described is repeated twenty-one more times so as to thereby effect the desired twenty-two turns of all the cores embraced within the same loop. After completing the twenty-two turns the other end of said wire 60 is connected to a respective one of the contacts on the plug 15. It will be noted that the loops in the respective wires 60 which comprise the column-wise windings of a memory section are each brought around the outside of the stack of trays and along the side faces thereof within the transverse channels 39, 42 formed in the tray 21 and covers 22 respectively, except for the windings associated with the cores of core positions IX, X.

In the case of these last two mentioned core positions the loops in the wire 60 which effect the column-wise windings thereof are preferably, tho not necessarily, brought around the bottom of the stack of trays and within the longitudinally extending channels 38, 41 of the trays and covers respectively. This arrangement serves to keep the column-wise write-in, read-out windings for the cores of said two last mentioned core positions separate from the pickup windings for the same core positions which as can be seen with respect to the showing of the tray 21*k*, Fig. 6, wind about the outside of the tray in the transverse channels 39, 42 in order to achieve the desired direction of pickup windings for the cores in core positions IX, X.

It will be seen that the provision of intersecting longitudinal and transverse channels at the respective core positions gives rise to considerable flexibility in the choice of wiring plans, since it enables various combinations of cores to be embraced within the loops in a variety of ways.

It will also be apparent that since the column-wise windings by the wires 60 are more easily threaded than the row-wise windings 50, 55 in view of the fact that the separate loops constituting the column-wise windings embrace all the trays of the stack and are effected by a single passage of the wire thru the correspondingly positioned cores of the entire memory section, the wiring plan employed for any given application will be most advantageously one wherein the dimension requiring the greater number of turns is the columnwise dimension.

The driving means for the column-wise windings of which a typical one will be hereinafter more fully described, drives pulses of the same polarity in the selected wires 60 in the write-in portion of a cycle, and since the individual magnetizable cores are sufficiently saturated only by a coincidence of a pulse in the row-wise dimension with a pulse in the column-wise dimension it will of course be understood that the determination of which end of the several wires 60 is directly connected to said driving means depends upon which direction the cores in the corresponding core positions are wound by the windings in the bias winding wire 50. Since half of the cores of a given tray are wound by a bias winding in one direction the other half being wound by a bias winding in the opposite direction it will be apparent that different ends of the several wires 60 are directly connected thru the contacts of plug elements 14, 15 to the column-wise driving means so that a coincidence of pulses for a particular core on its associated write-in and bias windings will have the desired cumulative effect in saturating the core rather than a nullifying effect which might otherwise be the case. As can be seen by reference to Fig. 6, the bias winding, shown in relation to the tray 21*b*, runs in the same direction for the cores at the core positions II, V, X, III, VIII and runs in the opposite direction for the respective cores located at core positions IV, VII, IX, I and VI. Accordingly, corresponding ends of each of the wires 60 for the core positions II, V, X, III, VIII, for example the end extending from the end tray 21*l*, will be separately connected to their respective columnar pulse driving means, the other ends of the wires 60 associated with said core positions, for example the ends extending from the end tray 21*a*, being connected to a return wire common to all the columnar windings. The connections of the line 60 for the other core positions, i.e. core positions IV, VII, IX, I and VI, being reversed to those above mentioned requires that the other end of the wires for each of such latter named positions, the end extending from the end tray 21*a*, being separately connected to the respective columnar pulse driving means, while the one end of each of said latter mentioned group of wires 60 would be connected to the common return wire for all the columnar windings of the memory section.

Figure 5A:
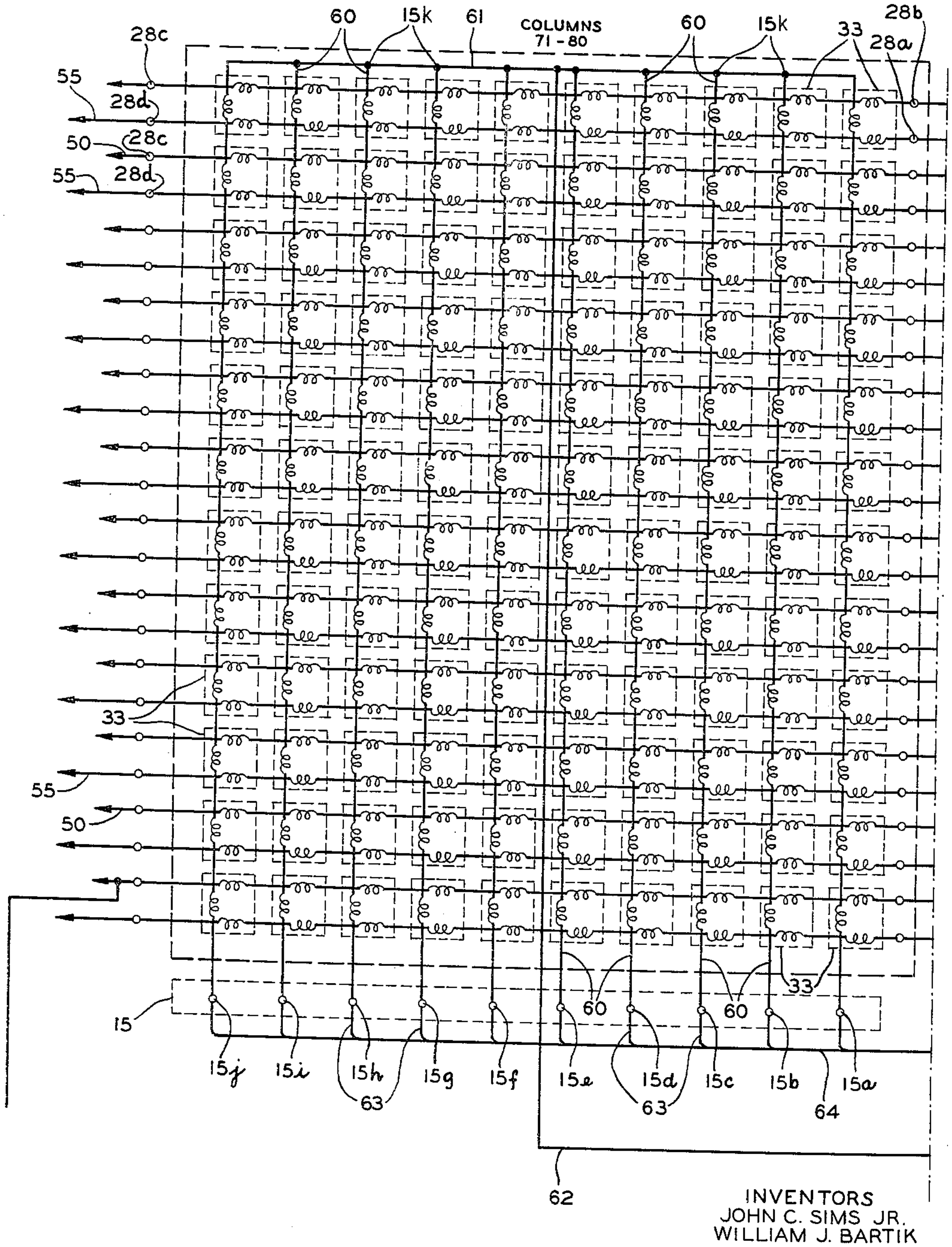
Figs. 5A, 5B are a schematic wiring diagram of the unit shown in Fig. 1.
Figure 5B:
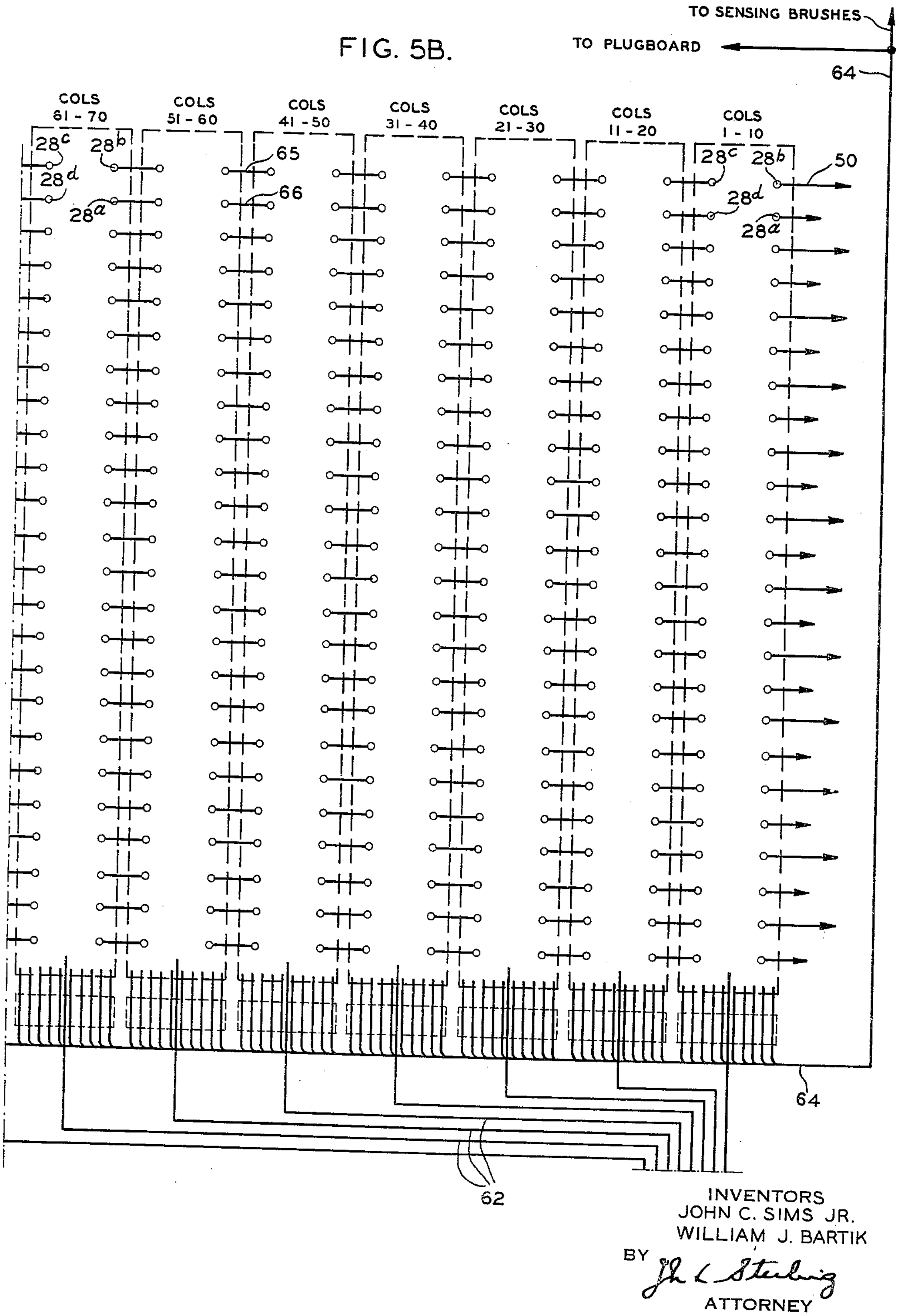

Figs. 5A, 5B show the wiring plan for the entire memory unit which is heretofore mentioned consists of eight memory sections each section having capacity for storing the data sensed from ten card columns. In Fig. 5A the wiring plan for a single memory section corresponding to card columns seventy-one thru eighty, reading from right to left, has been shown in a detailed manner so as to illustrate with greater clarity the wiring plan employed. Each core or bobbin 33 of a memory section is shown in Fig. 5A by rectangles, in broken lines, arranged in rows and columns so as to correspond graphically to the lay out of the index positions of a punched card, it being understood that each row of cores which extends horizontally represents the ten cores within a single tray of the memory section, the twelve cores extending in a vertical column in Fig. 5A representing the cores at corresponding core positions in each of the twelve trays which comprise a memory section. The cores constituting column seventy-one represent all the cores in core positions I, Fig. 6, column seventy-two in Fig. 5A representing the cores designated at core positions II in Fig. 6 and so on thru the ten columns of cores shown. The bias winding for each core of a given row of cores is effected by the wire 50 running thru its respective row of cores in series. The pickup winding for each row of cores is provided by the separate wire 55 for each row, running thru the cores in series. It will be noted that the pickup windings run thru the succession of cores in a given row in opposing directions alternately from one core to the next. This is for the purpose of cancelling stray noise pickup and minimizing output due to pulsing current in bias winding during the read-out of the memory as hereinbefore mentioned. The write-in, read-out winding for the cores proceeds column-wise thru the cores of a section and is effected by the wire 60 of which there is one for each column of cores, the windings for each core of a given column being in effect connected in series. One end of each of the wires 60, the lower end as shown in Fig. 5A, is connected to a repsective one of the contacts 15*a* thru 15*j* of the male portion 15 of the multi contact plug by which means each columnar winding is separately connected to its respective pulse driving means which may be either a separate card column sensing means for accomplishing the memory write-in operation or to respective column counting means, which may be of any suitable type, for separately pulsing the wires 60 serially with a pulse of polarity opposite to the polarity of the write-in pulse so as to restore any core which may have been saturated during the write-in function to its original condition, to thereby effect the memory read-out functions. The other end of each of the wires 60, the upper ends as shown in Fig. 5A, are connected to the remaining contacts of the male plug portion 15, which remaining contacts are joined by a wire 61 so as to in effect constitute one common contact, the wire 61 being joined to a common return wire 62 for all of the columnar windings of one memory section, there being one return wire for each of the several memory sections. Since one end of each of the wires 60 is connected to a common return, the plug portion 15 as seen in Figs. 1 and 2 is not required to have twenty separate contacts and in the present instance is provided with 16 contacts, the ten contacts 15*a* to 15*j* separately connecting one end of each wire 60 to its respective driving means, the other end of each of the wires 60 being connected to any one of the remaining six contacts which as above mentioned are joined together so as to constitute a common contact for the return side of each of the columnar windings of a memory section.

The female portion 14 of the plug is wired with separate wires 63 connected through the plug with a respective one of the wires 60 so as to connect each columnar winding with its respective pulse driving means, the wires 63 running through a common conduit 64 which leads the separate wires 63 to their respective card sensing and column counting means, not shown in Fig. 5A, 5B, by which means the write-in and the read-out pulses are obtained, as aforemention. The several memory sections of the over all memory unit are connected by jumper wires 65, 66. The jumper wires 65 join the bias windings of corresponding trays of the several sections in series connecting post 28*c* of one tray with post 28*b* of a tray in another section. Wires 66 join the pickup windings, in series, of corresponding trays of the several memory sections, said wires interconnecting the jumper pins 28*d* of one section with pins 28*a* of the corresponding trays in another section. The several bias winding wires 50 which run row-wise and of which there are twelve in the present embodiment are connected to row counting means, not shown, which operates to pulse the wires serially and synchronously with the passage of corresponding rows of index positions of a card past the card sensing means so that upon sensing of a perforation in a card index position a coincidence of pulses in the respective vias and read-in windings of the corresponding core will occur to thereby alter the magnetic condition of said corresponding core and thus store the data thus sensed. Read-out of the memory if effected by column counting means, not shown, which serially pulse the several wires 60 with pulses of polarity opposite to the write-in pulse, so as to restore all cores which have stored data to their original condition, thus inducing pulses on the pickup windings in the respective wires 55. The output of the memory unit on the several wires 55 is preferably amplified by means not shown which include polarity inverting means, since the pickup windings run through the cores of successive columns in opposite directions alternately. Accordingly, the final resulting pulses will all be of the same polarity for operating the means by which the data read-out from the memory unit may be used for required functions such as for data comparing or for recording on magnetic tape.

Fig. 7 illustrates typical circuitry which may be employed for driving the respective row-wise and column-wise windings of the memory unit, and in the following description thereof current flow will be considered as being in the same direction as electron flow. Describing first the row-wise bias winding in the wires 50 it will be seen that each of said wires is connected to the plate of an associated tube V1 through a related diode D1 which has the proper polarity across it from the current sources +290 volts, +230 volts respectively, for conduction. If, for the moment, the current being supplied to the bias wire line 50 from the +150 volt supply through resistors R3, R4 is ignored, the current through the resistors R1, R2 and all the windings of the memory row is approximately forty two milliamperes in the direction of the +290 volts supply. The current from the +150 volt source being supplied through resistors R3, R4, ignoring the current through the resistors R1, R2, is approximately twenty one milliamperes in the direction of the +230 volts supply. Considering the two currents simultaneously the resultant current is twenty one milliamperes through the memory row in the direction of the +290 volts supply. The column wise write-in, read-out windings in the respective wires 60 do not carry any current during their static conditions since both ends of said lines are returned to the +230 volt supply. The combination of the two conditions above described places all the magnetic cores of the row at their static or quiescent operating point A, as indicated in Fig. 8.

When a card is fed to the sensing brushes *k*, the row is altered through counting means, not shown, which pulses the grid of tube VI causing the tube to start conducting. The plate of tube VI is clamped at +225 volts through diode D2 and the diode D1 disconnects, switching the current in the memory row, wire 50, to 21 milliamperes in the direction of the +230 volt supply, which current alone disturbs the magnetic condition of the cores to the point B, Fig. 8, but is insufficient to significantly alter the magnetic condition of the cores to result in an indication of data storage therein. The voltage to the brushes $k$ at T1 steps from +230 volts to +310 volts just as the row of the card comes under the row of brushes. The contacts at the brushes $k$ are opened from the brush +230 volt return by the surface of the card unless there is a perforation sensed by one of the brushes in which case the line 60 of the corresponding column will be pulsed by the upward current flow from the +230 volt return to the +310 volt brush supply source. As a result of sensing a perforation in a card, it will be seen that the corresponding core of the memory will receive a coincidence of currents on the related bias and read-in windings thereof so as to significantly alter its magnetic condition to a point which may be regarded as being at the opposite extreme of its hysteresis loop. Although the out-put winding of said magnetic core receives a signal during this transition, the signal on the out-put or pickup wire 55 has no significance since the wires 55 are gated, by means not shown herein, and the gates are not permissive at this time. The tube V1 turns off as a row of the card passes the brushes, the row counting means is stepped to alert the next row of the memory, and the magnetic cores in which information was stored, shift to their stable condition represented by point D in the top leg of their hysteresis loop, which is the condition in which the core remains until the memory is read out.

The memory read-out is caused by current through the windings of the respective wires 60 in a downward direction, the direction opposite to the direction of the write-in pulse. This action is controlled by column counting means, not shown, which causes the several lines 60 to be pulsed in succession during the read-out portion of the entire operating cycle, the read-out pulse acting to restore each magnetic core in which information was stored to its original magnetic condition at point A. This transition in the magnetic condition of the core, i.e. from top to the bottom leg of its hysteresis loop induces a current in the read-out windings in the wire 60 so as to thereby result in an output signal or pulse which will occur at a time in the output portion of the cycle corresponding to the position of the respective column in the sequential order in which the columnar read-out pulses are applied during the read-out operation. The output pulses thus induced are transferred by the wires 55 to gate memory amplifiers, not shown, which are alerted during the read-out portion of the cycle and thus pass the output pulses which are representatives of stored information.

A portion of the circuit which performs the read-out function is shown at the top of Fig. 7. Tubes V2, V3 are tubes in a function table, driven by column counting means, not shown, which operates to result in a one hundred and twenty count by the column counting means during the read-out portion of each complete operating cycle. Although the card employed in the present instance and the memory unit is provided with eighty column capacity, the column counter proceeds thru a one hundred twenty column count during the read-out portion of the operating cycle since the information on the card is being transferred to a tape where the information is recorded in blockettes, each blockette containing one hundred twenty items or data representations. Means, not shown, are provided for filling in each blockette of the tape with fill in representations over and above the data representations transferred from the sensed card so as to thereby completely fill up the blockette with one hundred twenty items. A pair of tubes V2, V3 are provided in the function table for each memory column, and only once during a one hundred twenty count by the column counter will the two tubes of a pair have coincidence. When this occurs the two tubes conduct and their plates are clamped to +227 volts through diodes D6, D7 respectively. This condition causes the diode D3 to connect and current flows down from the +150 volt supply thru the plugboard and respective memory column on wire 60 to the +230 volt supply. This is the action which reads out a single memory column, and the action is repeated in the same for all other columns as they are selected by the paired tubes V2, V3 of the function table as aforesaid.

Read-out of the memory can be inhibited row-wise. This is done by realerting the row-drive tube V1 which will then reverse the current thru that particular row thereby shifting the magnetic condition of the respective memory core in which data is stored, from point D to point C, on its hysteresis loop. When the column is selected for a read-out pulse on line 60 the magnetic condition of a core in an inhibited row and storing data will be shifted along the top leg of its hysteresis loop back to point D, which is an insufficient change to induce a pulse in the respective read-out winding, and since no transition takes place in the core no signal will reach the read-out wire for the respective inhibited core. As can be seen the plugboard serves as a switchboard for the read-out for the memory, it being the means by which the respective columnar read-out windings in the wires 60 are connected to their respective pulse drivers in the function table FT3. By arranging the connections on the switchboard table it is possible to rearrange information on the tape, so that it will appear in a different sequence on the tape from that on the card. The plugboard also provides the means by which the fill in representations above mentioned can be recorded on the tape at any desired point of the one hundred twenty count by the column counter as aforesaid.

From all the foregoing it will be apparent that the features and principles shown and described herein in accordance with the present invention result in achieving a memory or like device which is compact in form, is more easily wound or wired than previous known devices of the same class, is provided with means for eliminating damage to the several core structure elements thereof as a result of handling, and wherein the over all assembly constituting the device is arrived at thru an arrangement of components of like structural idenity in accordance with modular construction techniques thereby permitting wide flexibility in adapting the unit to different applications and to handling various capacities.

Although the present embodiment of the invention is shown as consisting of eight memory sections which are interconnected row-wise in series, with each section comprising twelve trays, each tray containing ten magnetic cores, it will of course be apparent that depending upon the application in which the device is to be used, each tray could contain fewer or more than ten core elements, each section could contain fewer or more than twelve trays, and each over all unit could consist of fewer or more than eight memory sections . And while the memory sections are shown as being connected row-wise in series, it will of course be apparent that should the application call for a substantially greater capacity of cores along the columnwise dimension, the separate memory sections could readily be inter-connected columnwise also, as well row-wise, thru suitable wiring inter-connecting the several multi-contact plugs 14 should such an increase in the column-wise dimension of the unit be required.

Although there has been shown and described herein what is considered as being a preferred form of the invention, it is of course obvious that various changes and modifications could be made without departing from the spirit of the invention, and it is therefore desired not to be limited to the specific features and procedures herein shown and described nor to anything less than the whole of the invention set forth and as hereinafter claimed.

What is claimed as new, and desired to secure by Letters Patent is:

1. In a device of the character described for mounting a plurality of core elements in association with plural windings thereon grouping said elements in a plurality of winding dimensions, a plurality of core supporting means each disposing a predetermined number of said core elements within a common plane, said supporting means being assembled in stacked relation to each other wherein correspondingly positioned elements of each of said predetermined number thereof are alined in a direction transverse to said common plane, a wire serially interconnecting the core elements of each of said supporting means, each wire containing loops completely embracing adjacently disposed core elements to effect a winding thereon in one winding dimension, and wires each looped to embrace all correspondingly positioned core elements in each of the several core supporting means to effect the winding of the core elements in another winding dimension.

2. In a device of the character described for mounting a plurality of core elements in association with plural windings thereon grouping said elements in a plurality of winding dimensions, a plurality of core supporting means each disposing a predetermined number of said core elements within a common plane, said supporting means being assembled in stacked relation to each other wherein correspondingly positioned elements within each of said grouped predetermined number thereof alined in a direction transverse to said common plane, a plurality of wires each serially interconnecting the core elements within each of said supporting means each of said wires containing loops completely embracing adjacently disposed core elements to effect a corresponding plurality of windings for each core element along one winding dimension, and wires each looped to embrace all correspondingly positioned core elements within each of the several core supporting means to effect the winding for each core element along another winding dimension.

3. In a device of the character described for mounting a plurality of core elements in association with plural windings thereon grouping said elements in a plurality of winding dimensions, a plurality of supporting trays each being compartmented into a plurality of pockets each containing one of said core elements, said trays being assembled in stacked relation to each other wherein correspondingly positioned pockets of each tray support their respective cores in alinement along a direction transverse to the plane of the trays, wires each serially interconnecting the core elements contained within a tray each wire containing loops completely embracing adjacently disposed core elements to effect windings thereon along one winding dimension, and wires each looped to embrace the cores contained in all the correspondingly positioned pockets of the several trays to effect the winding of the core elements along another winding dimension.

4. In a device of the character described for mounting a plurality of core elements in association with plural windings thereon grouping said elements in a plurality of winding dimensions, a plurality of core supporting trays each being compartmented to provide a plurality of pockets each containing a core element and disposed adjacent an edge of the tray, said supporting trays being assembled in stacked relation to each other wherein correspondingly positioned pockets of each tray dispose their respective cores in alinement along the direction intersecting the plane of the tray, a wire serially interconnecting the core elements of each tray, said wire containing loops completely embracing a pair of core elements to effect a winding thereon in one winding dimension, and wires each looped to embrace the core elements contained in the correspondingly positioned pockets of the several supporting trays to effect the winding of the core elements along another winding dimension.

5. In a device of the character described for mounting a plurality of core elements in association with plural windings thereon grouping said elements in a plurality of winding dimensions, a plurality of core supporting trays each compartmented into pockets containing a single core element and disposed adjacent an edge of said tray, the surface of said tray being formed with openings communicating with each pocket and a network of channels intersecting at said surface openings, said trays being assembled into a stack thereof wherein the cores contained within correspondingly positioned pockets of the several trays are alined along a direction intersecting the planes of the trays, and a plurality of windings for each core element interconnecting the several core elements of the stack along different winding dimensions, the winding along one dimension comprising a wire running serially through each core element contained within a tray and containing loops completely embracing adjacently disposed core elements, said wire in proceeding from one element to another passing exteriorly of the supporting tray through the said surface openings and within the said channels, the winding along the other dimension comprising a wire running serially through the core elements in the correspondingly positioned pockets of the several trays which comprise the said stack, said last mentioned wire in proceeding from one core element to another passing through related surface openings in the several trays and interiorly of said stack, said last mentioned wire returning exteriorly of the stack within the surface channels of the several trays to complete a loop embracing all of the core elements contained within said correspondingly positioned tray pockets.

6. In a device of the character described for mounting a plurality of core elements in association with plural windings thereon grouping said elements in a plurality of winding dimensions, a plurality of supporting trays each compartmented into a plurality of pockets each containing one of said core elements, said trays including covers for retaining the core elements in their respective pockets, the trays and covers being formed with openings communicating with said pockets and assembled in stacked relation to each other wherein correspondingly positioned pockets of each tray support the respective cores in alinement along a direction transverse to the plane of the trays, wires each serially interconnecting the core elements contained within a tray, each wire containing loops completely embracing a pair of core elements to effect windings on the elements of a tray along one winding dimension, and wires each looped to embrace the cores contained in all the correspondingly positioned pockets of the several trays to effect the winding of the core elements of the several trays along another winding dimension.

7. In a device of the character described for mounting a plurality of core elements in association with plural windings thereon grouping said elements in a plurality of winding dimensions, a plurality of core supporting means each disposing a predetermined number of said core elements within a common plane, said supporting means being assembled in stacked relation to each other wherein correspondingly positioned elements within each grouped predetermined number thereof aline in a direction transverse to said common plane, a plurality of wires each serially interconnecting the core elements within each of said supporting means each of said wires containing loops completely embracing a pair of core elements to effect a corresponding plurality of windings for each core element along one winding dimension, said plurality of wires proceeding through certain of said core elements in the same direction and through others of said core elements in opposite directions, and wires each looped to embrace all correspondingly positioned core elements within each of the several core supporting means to effect the winding for each core element along another winding dimension.

8. In a device of the character described, a plurality of trays each compartmented into pockets lying in a common plane with each disposed adjacent an edge of the tray, said trays being arranged in stacked relation to each other to dispose correspondingly positioned pockets of the several trays in alinement in a direction intersecting the common planes of the pockets, a substantially toroidal core contained within each of said pockets the axis of said cores extending in the same direction as that in which said trays are stacked, a first winding for each said cores comprising a wire looped to embrace completely adjacent cores within a tray in pairs, said wire interconnecting the several loops of a tray to associate the said first windings for the cores of a tray in one winding dimension, and a second winding for each of said cores comprising a wire looped to embrace in single convolutions thereof all cores contained in correspondingly positioned pockets of the several trays, said last mentioned wire associating the second windings for the cores along another winding dimension.

9. The invention as set forth in claim 8 wherein the cores are formed of magnetizable material possessing a substantially square hysteresis loop.

10. The combination as set forth in claim 8 wherein the cores are formed from a ribbon of magnetizable material wrapped about the periphery of a bobbin, the bobbin being formed of non-magnetizable material.

11. In a device of the character described, a plurality of trays each compartmented into pockets lying in a common plane each disposed adjacent an edge of the tray, said trays being arranged in stacked relation to each other to dispose correspondingly positioned pockets of the several trays in alinement in a direction intersecting the common planes of the pockets, a magnetizable toroidal core contained within each of said pockets, the axis of said cores extending in the same direction as the direction of stacking of said trays, a first winding for each of said cores comprising a wire looped to embrace completely pairs of cores within a tray said wire interconnecting the several loops of a tray to associate the said first windings for the cores of a tray in one winding dimension, a second winding for each of said cores comprising a wire looped to embrace in single convolutions thereof all cores contained within correspondingly positioned pockets of the several trays, said last mentioned wire associating the second windings for the core along another winding dimension, driving means for successively applying current to the several wires effecting the windings along said one dimension, and driving means for selectively applying driving current to one of the wires effecting the windings along the other dimension, said last mentioned driving means being operable synchronously with the first mentioned driving means and when operated being effective for saturating the core having windings coincidentally receiving current from the respective driving means.

12. In a device of the character described, a plurality of trays each compartmented into pockets lying in a common plane and each disposed adjacent an edge of the tray, said trays being arranged in stacked relation to each other to dispose correspondingly positioned pockets of the several trays in alinement in a direction intersecting the common planes of the pockets, a magnetizable toroidal core contained within each of said pockets, the axis of said cores extending in the same direction as the direction of stacking the said trays, a first winding for each of said cores comprising a wire looped to embrace completely pairs of cores within a tray said wire interconnecting the several loops for the cores of one tray to associate the said first windings for the cores of a tray in one winding dimension, a second winding for each of said cores comprising a wire looped to embrace completely pairs of cores in the tray, said wire proceeding through certain of the cores in the same direction as the wire effecting said first windings and proceeding through other cores of the tray in a direction opposite to the direction of the wire effecting said first windings, said second mentioned wire associating the cores of a tray along the same one dimension, a third winding for each of said cores comprising a wire looped to embrace in single convolutions thereof all cores contained in correspondingly positioned pockets of the several trays, said last mentioned wire associating the third windings for the cores along another winding dimension, write-in means controlled to apply current coincidently through a wire effecting said first windings on the cores and a wire effecting said third windings on associated cores, said write-in means when effective magnetically saturating the core receiving said coincidence of current, and read-out means for serially pulsing the wires effecting the said third windings with a pulse of polarity opposite to that of the write-in pulse applied through the third windings, the series of pulses by said read-out means being applied alternately to the wires associated with cores whereon the windings along said one dimension run in the same direction and to the wires associated with cores whereon the windings along said one dimension run in opposite directions.

13. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the said common plane, threading a wire through the bores of all elements of a group, said wire being looped to completely embrace adjacently disposed elements to effect a winding for each element along one winding dimension, stacking said groups one along side the other with the similarly disposed elements of the respective groups in alinement, and threading a wire through the bores of the several elements thus alined to effect a winding on each element along another winding dimension.

14. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the common plane of the group, threading a wire through the bores of all elements of a group, said threading proceeding through a series of loops each completely embracing adjacently disposed elements, each loop being repeated a predetermined number of times to effect a corresponding number of turns for each element along one winding dimension, stacking said groups one along side the other with the similarly disposed elements of the respective groups in alinement, and threading a wire through the bores of the several elements thus alined in a plurality of loops to effect a corresponding plurality of turns on each element along another winding dimension.

15. The method of assembling a plurality of substantially toroidal shaped elements in association with plural windings interconnecting said elements in a plurality of winding dimensions which comprises the steps of, arranging said elements into individual groups each containing a predetermined number of said elements similarly disposed within a common plane and with the axis of each element intersecting the plane of the group, threading a plurality of wires through the bores of all elements of the group, each said threading containing loops embracing said elements in pairs to effect windings for each element along one winding dimension, stacking said groups one alongside the other with the similarly disposed elements of the respective groups in alinement, and threading a wire through the bores of the several elements thus alined to effect a winding on each element along another winding dimension.

16. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the plane of the group, threading a plurality of wires through the bores of all elements of a group, each said threading including loops embracing said elements in pairs, each loop of said wires being repeated a predetermined number of times to effect a corresponding number of turns for each element along one winding dimension, stacking said groups one alongside the other with a similarly disposed elements of the respective groups in alinement, and threading a wire through the bores of the several elements thus alined in a loop repeated a plurality of times to effect a corresponding plurality of turns on each element along another winding dimension.

17. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the plane of the group, threading a first wire through the bores of all elements of a group, said wire being looped to embrace said elements in pairs to effect a winding for each element along one winding dimension, threading a second wire through the bores of all elements of a group to effect a second winding for each element along said one winding dimension, said second wire containing loops embracing said elements in pairs and proceeding through certain of said elements in the same direction as that of said first wire and through other of said elements in a direction opposite to that of said first wire, stacking said groups one alongside the other with the similarly disposed elements of the respective groups in alinement, and threading a wire through the bores of the several elements thus alined to effect a winding on each element along another winding dimension.

18. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the plane of the group, threading a first wire through the bores of all elements of a group, said threading proceeding through a succession of loops each embracing said elements in pairs, each loop being repeated a predetermined number of times to effect a corresponding predetermined number of turns for each element along one winding dimension, threading a second wire through the bores of all elements of a group, the threading of said second wire proceeding through certain of the elements in the same direction as that of said first wire and through others of said elements in a direction opposite to that of said first wire, said second wire threading including loops embracing pairs of said elements, each loop in said second wire being repeated a predetermined number of times to effect a corresponding predetermined number of turns for each element along said one winding dimension, stacking said groups one along side the other with the similarly disposed elements of the respective groups in alinement, and threading a wire through the bores of the several elements thus alined in a loop embracing all said alined elements, said last mentioned loop being repeated a plurality of times to effect a corresponding plurality of turns on each element along another winding dimension.

19. The method of assembling a plurality of substantially toroidal shaped elements in association with plural windings thereon interconnecting said elements in a plurality of winding dimensions which comprises the steps of, arranging said elements into individual groups each containing a predetermined number of said elements similarly disposed within a plane common to the group and with the axis of each element intersecting the plane of the respective group, threading a wire through all elements of a group, said wire being looped to embrace said elements in pairs to effect a winding for each element along one winding dimension, stacking a predetermined number of said groups one alongside the other into individual sections with the similarly disposed elements of the respective groups within a section in alinement, threading a wire through the bores of the several elements in a section thus alined to effect a winding on each element along another winding dimension, and connecting the wires of one section with the corresponding wires of another section to join the windings corresponding in the several sections in series.

References Cited in the file of this patent

UNITED STATES PATENTS

| | | |
|---|---|---|
| 1,988,734 | Helgason | Jan. 22, 1935 |
| 2,654,142 | Horelick | Oct. 6, 1953 |
| 2,700,150 | Wales | Jan. 18, 1955 |
| 2,712,126 | Rosenberg | June 8, 1955 |
| 2,724,103 | Ashenhurst | Nov. 15, 1955 |
| 2,783,416 | Butler | Feb. 26, 1957 |
| 2,784,391 | Rajchman | Mar. 5, 1957 |
| 2,823,360 | Jones | Feb. 11, 1958 |
| 2,823,371 | Jones | Feb. 11, 1958 |
| 2,825,891 | Duinker | Mar. 4, 1958 |